US012026323B2

(12) United States Patent
Kim et al.

(10) Patent No.: US 12,026,323 B2
(45) Date of Patent: Jul. 2, 2024

(54) OPTICAL DIGITAL PEN BY USE OF LIGHT SCATTERING

(71) Applicants: Chun Seop Kim, Suwon-si (KR); Kyu Tae Kim, Seoul (KR)

(72) Inventors: Chun Seop Kim, Suwon-si (KR); Kyu Tae Kim, Seoul (KR)

(73) Assignee: BONA INC., Seongnam-si (KR)

( * ) Notice: Subject to any disclaimer, the term of this patent is extended or adjusted under 35 U.S.C. 154(b) by 0 days.

(21) Appl. No.: 18/137,365

(22) Filed: Apr. 20, 2023

(65) Prior Publication Data
US 2023/0384873 A1    Nov. 30, 2023

(51) Int. Cl.
*G06F 3/0354* (2013.01)

(52) U.S. Cl.
CPC ...... *G06F 3/03542* (2013.01); *G06F 3/03545* (2013.01)

(58) Field of Classification Search
CPC .......................... G06F 3/03542; G06F 3/03545
See application file for complete search history.

(56) References Cited

U.S. PATENT DOCUMENTS

| 2014/0166851 A1* | 6/2014 | Kim | G06F 3/0308 |
| | | | 362/249.1 |
| 2014/0267185 A1* | 9/2014 | Arends | G06F 3/03545 |
| | | | 345/179 |
| 2014/0300589 A1* | 10/2014 | Tanaka | G06F 3/03542 |
| | | | 349/12 |
| 2014/0362054 A1* | 12/2014 | Matsuki | G06F 3/0425 |
| | | | 345/175 |
| 2015/0070328 A1* | 3/2015 | Yamaguchi | G02B 6/0051 |
| | | | 349/12 |

FOREIGN PATENT DOCUMENTS

| JP | 2013-152705 A | 8/2013 |
| KR | 10-0408518 B | 11/2003 |
| KR | 10-0438846 B | 6/2004 |
| KR | 10-2014-0048655 A | 4/2014 |
| KR | 10-2014-0120484 A | 10/2014 |
| KR | 20-0485305 B | 12/2017 |
| KR | 10-2073000 B | 2/2020 |
| KR | 10-2109649 B | 5/2020 |
| KR | 10-2213541 B | 2/2021 |

* cited by examiner

*Primary Examiner* — Kenneth B Lee, Jr.
(74) *Attorney, Agent, or Firm* — PARK LAW FIRM

(57) ABSTRACT

The present invention generally relates to a structure of an optical digital pen. In particular, the invention relates to an optical digital pen by use of light scattering which can effectively acquire positional information of a pen tip even when the optical digital pen moves at a tilt on a display panel having a smooth surface. The invention is advantageous in that even when an optical digital pen is used at a tilt on a panel having a smooth surface made of glass or transparent plastic, reflected light for acquiring positional information of a pen tip is sufficiently received. In addition, the optical digital pen has an advantage of being compatibly used with a display panel of an electronic device such as a tablet PC or a laptop computer.

6 Claims, 12 Drawing Sheets

(a)

(b)

OPTICAL DIGITAL PEN BY USE OF LIGHT SCATTERING

BACKGROUND OF THE INVENTION

Field of the Invention

The present invention generally relates to a structure of an optical digital pen.

In particular, the invention relates to an optical digital pen by use of light scattering which can effectively acquire positional information of a pen tip even when the optical digital pen moves at a tilt on a display panel having a smooth surface.

Description of the Related Art

In general, a digital pen (a smart pen or a touch pen) is used for displaying notes taken by a user on an electronic device (for example, a laptop computer, a smart phone, or a digital whiteboard) and saving the notes as a file, and the digital pen reads and wirelessly transmits track information to an electronic device when a user takes notes on special paper on which a dot pattern is printed.

In addition, a function of a digital pen has been applied to premium products such as a tablet PC or a laptop computer, and development of a note-taking application such as Notability or GoodNotes resulted in an increase in demand for the digital pen for an electronic device.

Solutions to a digital pen generally include an electromagnetic resonance stylus pen technology and a capacitive active pen technology. However, these technologies are technically difficult to ensure reliable performance on a display having a physical image size of 10 inches or larger and have to include a two-dimensional sensor arrangement, and thus problems of a significant increase in manufacturing costs due to an increase in display size and difficulties in coping with a change in type of form factor such as folding, rolling, or sliding arise.

In this respect, an optical digital pen has been developed as a solution to a pen for an electronic device. In an optical pen, since only a position code needs to be formed on a display by attaching a transparent film to which a dot pattern is applied on the display, even if there is an increase in display size, the degree of degradation of pen characteristics or increase in manufacturing costs are minimal. In addition, it can cope with a change in type of form factor such as folding, rolling, or sliding.

FIG. 1 is a diagram conceptually illustrating an internal configuration and an operation of an optical digital pen 10, and FIG. 2 is a block diagram illustrating a cooperative operation between the optical digital pen 10 and a smart terminal device 300.

When a user takes notes on a display panel 200 in a state of gripping a pen body 11, a pen tip 12 forms an operational contact track in a state of being contact with a surface of the display panel 200. In this case, the display panel 200 can be made of various materials such as a common paper material or can be configured of a liquid crystal display (LCD) made of a glass or reinforced plastic material or an organic light emitting diode (OLED) element.

A digital pen control member 14 uses a pressure sensing unit 13 so as to recognize that a user is actually taking notes on the display panel 200. The pressure sensing unit 13 is supported on a rear side by a pressure sensor support unit 13a and thus can detect pressure applied to a pen tip 12 due to note-taking. When the digital pen control member 14 discerns actual note-taking, the digital pen control member 14 controls an IR light emitting unit 17 such that light (for example, infrared (IR) light) is radiated to an outer surface of the display panel 200 in accordance with the movement of the pen tip 12.

The light radiated from the IR light emitting unit 17 is reflected from the surface of the display panel 200, and an IR light receiving unit 16 receives the reflected light. The display panel 200 has a position code 210 printed or formed as a display. The position code 210 can be realized as a dot pattern formed in accordance with special encoding rules. A transparent film, to which a transparent dot pattern absorbing an infrared light source is applied, is attached to the display panel 200, and the IR light emitting unit 17 radiates light from above the transparent film.

When the IR light receiving unit 16 collects reflected light (reflected IR light), information of the position code 210 corresponding to a movement track of the pen tip 12 is together acquired. The IR light receiving unit 16 can be configured to have an IR filter 16a, a CMOS optical element 16b, and an IR sensor 16c.

A coordinate computing unit 14a of the digital pen control member 14 analyzes the position code 210 acquired by the IR light receiving unit 16 and acquires a series of positional information indicating movement of the pen tip 12 on the display panel 200. The positional information acquired by the coordinate computing unit 14a is transmitted by short-range wireless communication (for example, Bluetooth) through a wireless communication unit 18 to a terminal communication unit 310 of the smart terminal device 300.

A hardware controller 14b of the digital pen control member 14 generally controls hardware of the optical digital pen 10.

Further, a terminal control unit 320 of the smart terminal device 300 displays a movement track of the pen tip 12 on a terminal panel unit 330 based on a series of positional information received by the terminal communication unit 310. The terminal panel unit 330 generally corresponds to the display panel 200, but it is not limited thereto.

In order for the smart terminal device 300 to accurately display notes (track) that a user takes, the IR light receiving unit 16 of the optical digital pen 10 has to be capable of acquiring the position code 210 of the display panel 200. In this respect, the light radiated from the IR light emitting unit 17 has to be reflected from the display panel 200 and then sufficiently transmitted to the IR light receiving unit 16.

FIG. 3 is an exemplary diagram illustrating comparison between states where the optical digital pen 10 is used according to panel materials in the related art.

FIG. 3A illustrates a state resulting from a case of using the optical digital pen 10 on a panel 201 made of a material having a rough surface such as a paper material. When the optical digital pen 10 is used on the panel 201 made of the paper material, the light radiated from the IR light emitting unit 17 can be sufficiently transmitted to the IR light receiving unit 16 after being reflected from the panel 201 regardless of whether the optical digital pen 10 is upright or tilted. Since a rough surface of the panel 201 diffusely reflects the light radiated from the IR light emitting unit 17, some of reflected light reaches the IR light receiving unit 16. Therefore, the optical digital pen 10 can be used on the panel 201 made of a paper material regardless of a tilt angle.

FIG. 3B illustrates a state resulting from a case of using the optical digital pen 10 on a panel 202 made of a material having a smooth surface such as a glass or transparent plastic material. In a case of using the optical digital pen 10 on the panel 202 made of the glass or transparent plastic material, when the optical digital pen 10 is tilted at a predetermined angle or larger, the light radiated from the IR light emitting unit 17 cannot be transmitted to the IR light receiving unit 16 after being reflected from the panel 202. Since a smooth surface of the panel 202 uniformly reflects the light radiated from the IR light emitting unit 17 at an angle symmetrical to an incident angle of the light, the more the optical digital pen 10 is tilted, the more the reflected light reaching the IR light receiving unit 16 decreases.

When the optical digital pen 10 is tilted at a predetermined angle or larger, the amount of reflected light reaching the IR light receiving unit 16 decreases to a threshold value or lower, and thus the optical digital pen 10 is not capable of operating normally. Accordingly, the optical digital pen 10 is considered not to be suitable for an electronic device such as a tablet PC or a laptop computer.

SUMMARY OF THE INVENTION

An object of the invention is to provide an optical digital pen which can effectively acquire positional information of a pen tip even when the optical digital pen moves at a tilt on a display panel having a smooth surface.

In order to achieve the above-described object, there is provided an optical digital pen by use of light scattering according to the invention including: a pen body member which forms a body of the optical digital pen; a pen tip member which is connected to one end portion of the pen body member, wherein the pen tip member forms a pen tip of the optical digital pen; a pressure sensor member which senses, by detecting pressure, an event in which the pen tip member comes into physical contact with a display panel; an IR light emitting member which generates light which is radiated to the display panel, wherein the display panel is formed of a position code; a lateral light scattering member which is disposed at a tilt to be close to the pen tip member and be directed toward the display panel, between the IR light emitting member and the display panel, wherein the lateral light scattering member scatters light irregularly in several directions with respect to the display panel in a process of transmitting or reflecting the light generated by the IR light emitting member; a downward light scattering member which is disposed to face a front surface of the display panel, with the pen body member being bent between the IR light emitting member and the display panel, wherein the downward light scattering member scatters light generated by the IR light emitting member irregularly in several directions with respect to the display panel; a lateral optical fiber member which is disposed in a length direction along the pen body member, wherein the lateral optical fiber member guides the light generated by the IR light emitting member to the lateral light scattering member; a downward optical fiber member which guides the light generated by the IR light emitting member to the downward light scattering member; an IR light receiving member which receives reflected light reflected from the display panel and senses the position code of the display panel; a digital pen control member which controls turning-on or turning-off of the IR light emitting member based on pressure information transmitted from the pressure sensor member, wherein the digital pen control member acquires a series of positional information of the pen tip member moving on the display panel, from the reflected light received by the IR light receiving member; and a wireless communication member which transmits the series of positional information acquired by the digital pen control member to an external smart terminal device by short-range wireless communication.

DESCRIPTION OF EMBODIMENTS

Hereinafter, the present invention will be described in detail with reference to the accompanying drawings.

In the description of an optical digital pen 100 according to the invention, the detailed description of a duplicate part as that of an optical digital pen 10 in the related art can be omitted.

Figure 1:
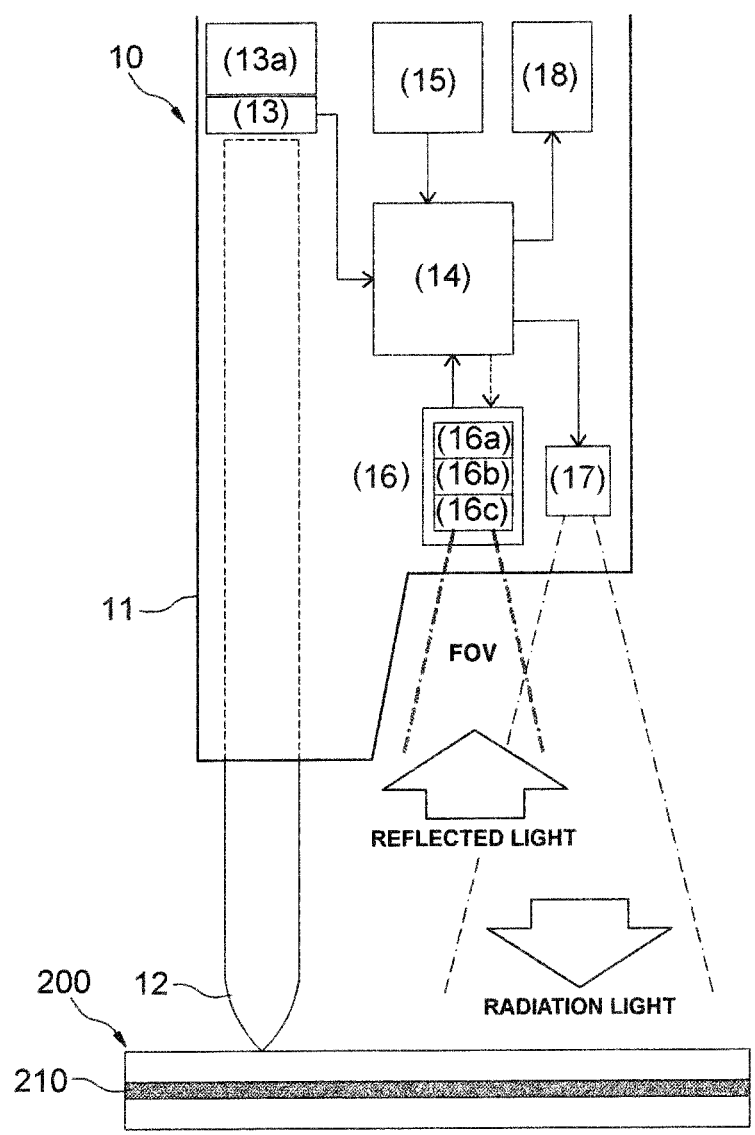
FIG. 1 is a diagram illustrating an internal configuration and an operation of an optical digital pen.
Figure 2:
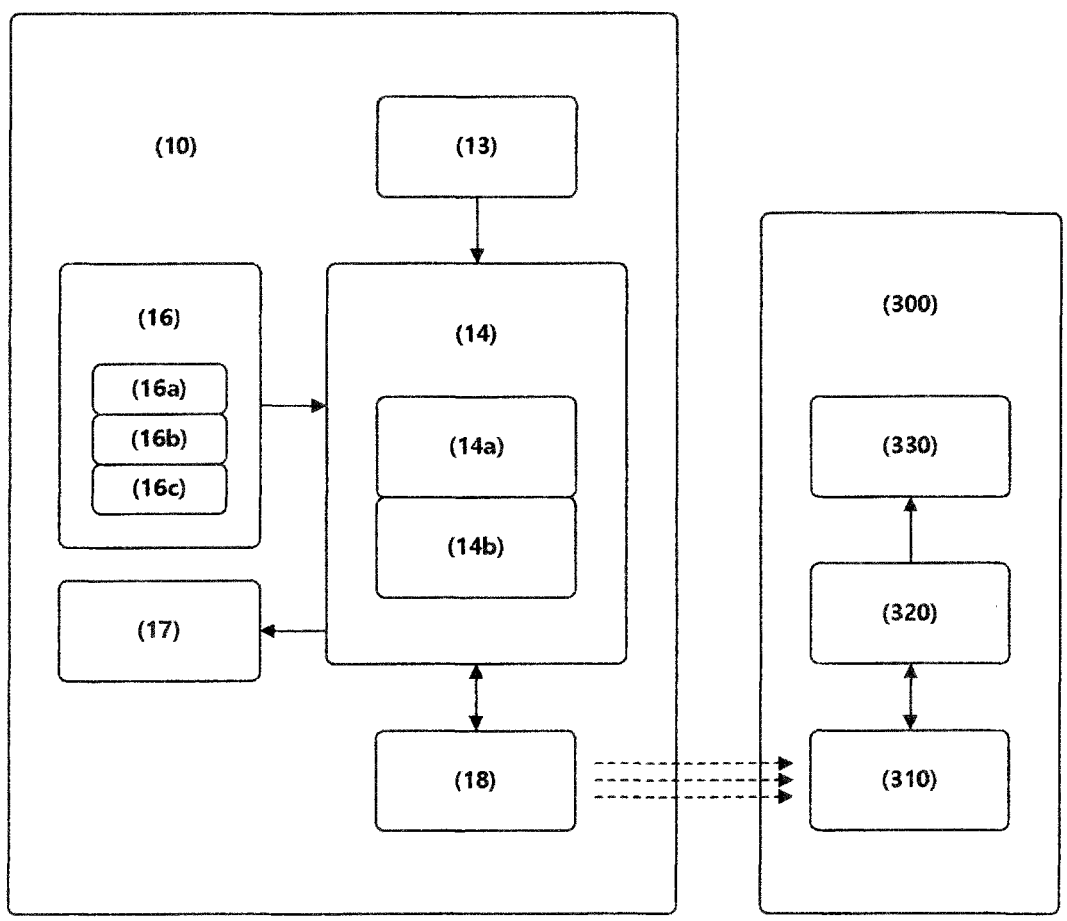
FIG. 2 is a block diagram illustrating a cooperative operation between an optical digital pen and a smart terminal device.
Figure 3:
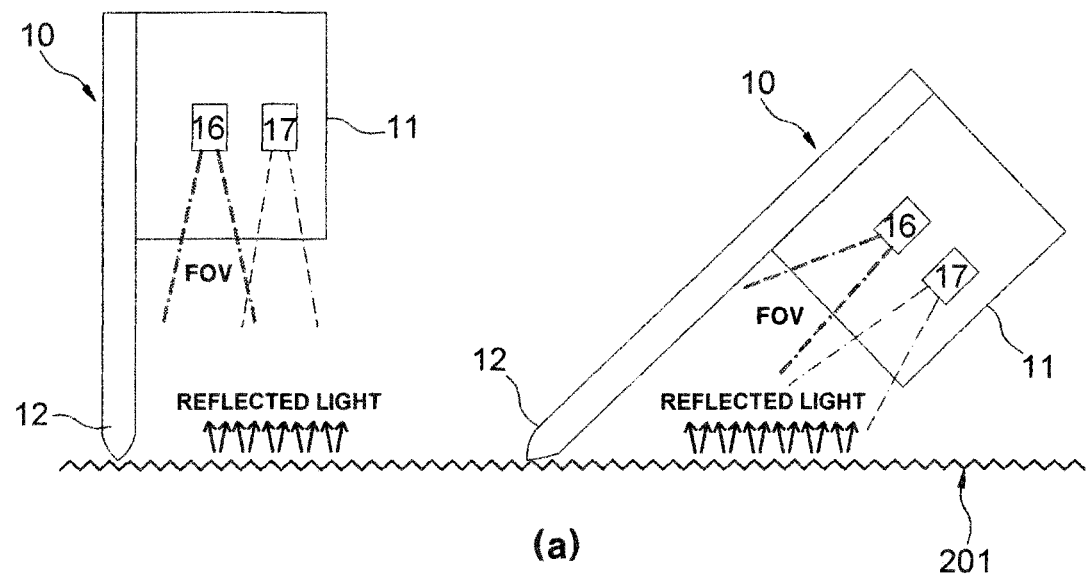
FIG. 3 is an exemplary diagram illustrating comparison between states where the optical digital pen is used according to panel materials in the related art.
Figure 3:
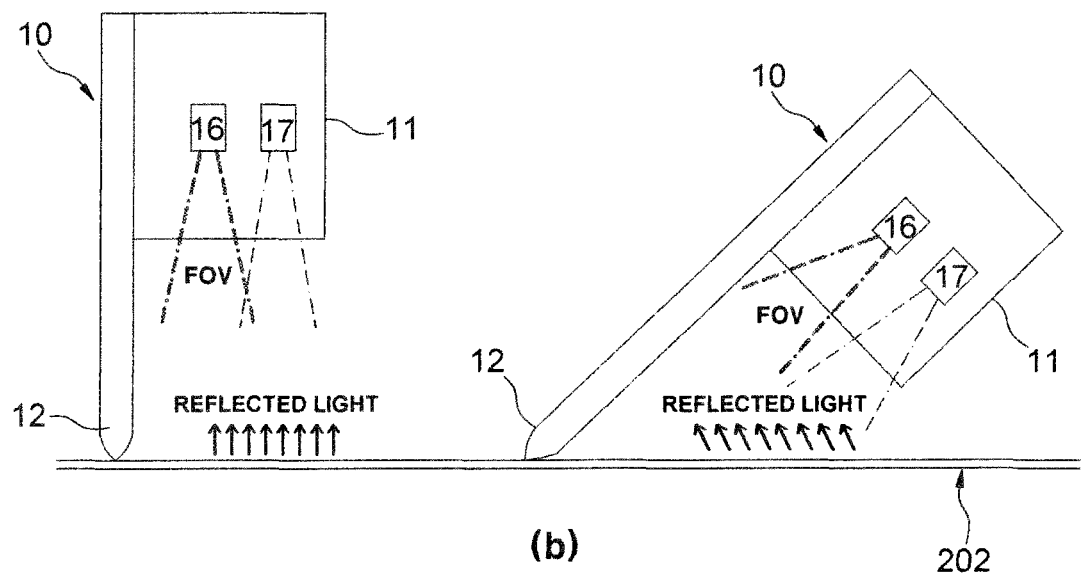
Figure 4:
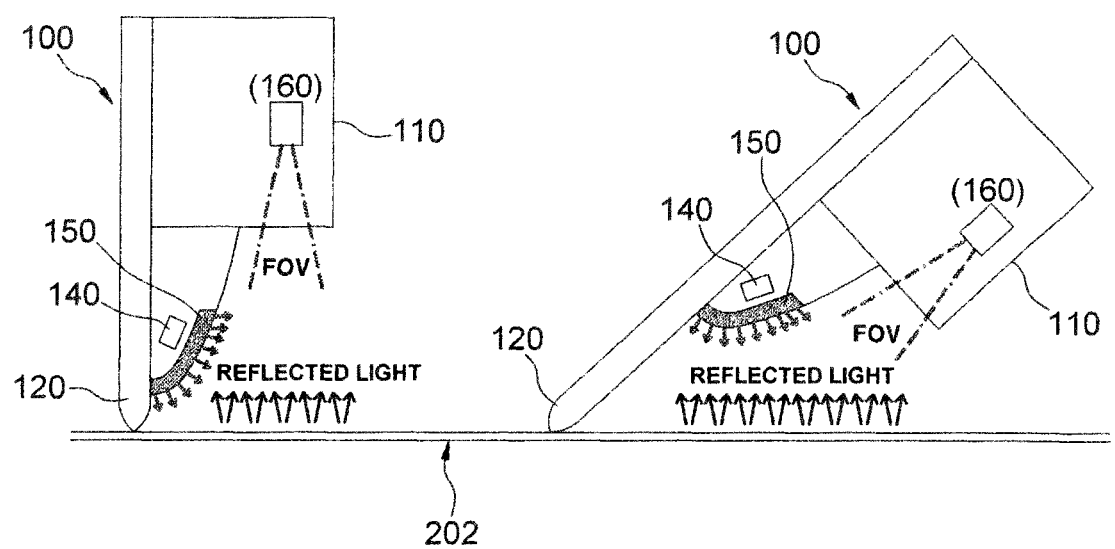
FIG. 4 is an exemplary diagram conceptually illustrating an optical digital pen according to the invention.
Figure 5:
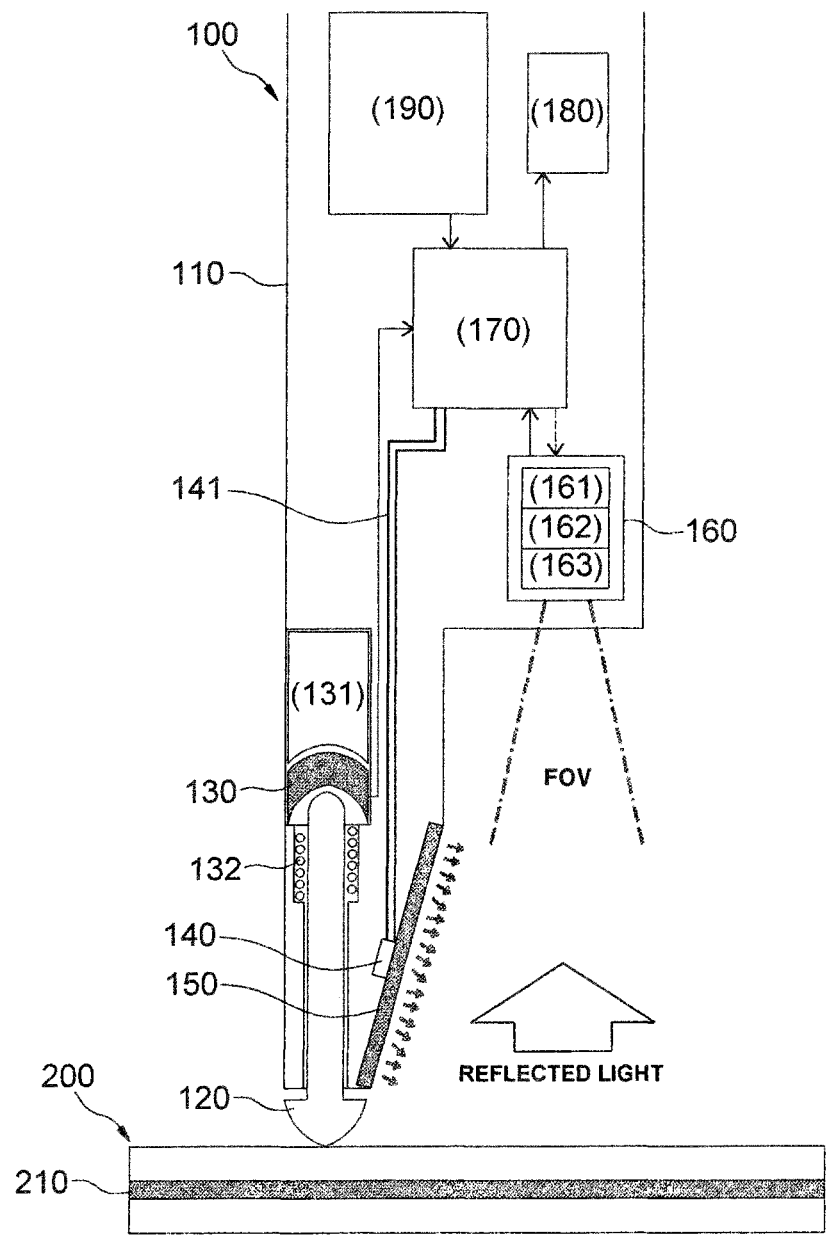
FIG. 5 is a diagram illustrating a first embodiment of the optical digital pen according to the invention.

FIG. 4 is a diagram conceptually illustrating the optical digital pen 100 according to the invention, and FIG. 5 is a diagram illustrating a first embodiment of the optical digital pen 100 according to the invention.

With reference to FIGS. 4 and 5, the optical digital pen 100 according to the invention includes a pen body member 110, a pen tip member 120, a pressure sensor member 130, an IR light emitting member 140, an IR light scattering member 150, an IR light receiving member 160, a digital pen control member 170, and a wireless communication member 180. These configurational elements are to be described.

The pen body member 110 can form a body of the optical digital pen 100 and, preferably, can be formed in a long bar shape so as to be convenient for a user to grip the pen body member 110.

The pen tip member 120 forms a pen tip of the optical digital pen 100, and is disposed at one end portion of the pen body member 110. The pen tip member 120 can be configured to slide over a top surface of a display panel 200 in accordance with manipulation of a user.

The pressure sensor member 130 is a configurational element that senses, by detecting pressure, an event in which the pen tip member 120 comes into physical contact with the display panel 200. A portion of the pressure sensor member 130 which is brought into contact with the rear end portion of the pen tip member 120 can be configured to be preferably hollowed and rounded to be fitted over and grip the rear end portion of the pen tip member 120. The hollowed rounding causes the pressure sensor member 130 to come into smooth contact with the rear end portion of the pen tip member 120 even when a user uses the pen body member 110 in a tilted state, and thus pressure generated by the pen tip member 120 can be effectively transmitted to the pressure sensor member 130. Here, the rear end portion of the pen tip member 120 which is brought into contact with the hollowed portion of the pressure sensor member 130 is preferably formed to project and be rounded.

Meanwhile, a sensor support member 131 is a configurational element that supports the pressure sensor member 130 by corresponding to the shape thereof such that the pressure sensor member 130 is maintained in a state of being strongly connected to the pen body member 110. A tension member 132 is a configurational element that supplies a restoring force to the pen tip member 120 such that the pen tip member 120 extends to the outside and retracts to the inside of the pen body member 110, and tension member 132 can be configured of a spring.

The IR light emitting member 140 is a configurational element that generates light (for example, IR light) which is to be radiated to the display panel 200.

The IR light scattering member 150 is a configurational element that is disposed close to the pen tip member 120 to be directed toward the display panel 200 and scatters light generated by the IR light emitting member 140 irregularly in several directions with respect to the display panel 200. In FIG. 5, the IR light scattering member is illustrated to scatter the light generated by the IR light emitting member 140 while transmitting the light. However, the IR light scattering member can be configured to scatter the light generated by the IR light emitting member 140 while reflecting the light according to an embodiment.

The IR light scattering member 150 can be disposed to tilt with respect to a length direction of the pen tip member 120 so as to be close to the pen tip member 120 and be directed toward the display panel 200. In order to install the IR light scattering member 150, an end portion of the pen tip member 120 can be bent as illustrated in FIG. 5.

As a result, light is radiated from the IR light scattering member 150 in various directions. A smooth surface of the display panel 200 or 202 reflects light at an angle symmetrical to an incident angle of the light, and thus reflected light from the display panel 200 is formed in various directions. Accordingly, a certain amount of the reflected light can be directed toward the IR light receiving member 160 as illustrated on the right side in FIG. 4.

The IR light receiving member 160 is a configurational element that receives reflected light entering an effective field of view (FOV) thereof and senses the position code 210 of the display panel 200. The FOV of the IR light receiving member 160 is illustrated for the convenience of description. The IR light receiving member 160 can include an IR filter member 161, a CMOS optical member 162, and an IR sensor member 163.

The digital pen control member 170 can recognize movement of the pen tip member 120 on the display panel 200 based on pressure information transmitted from the pressure sensor member 130. In this respect, the digital pen control member 170 controls the IR light emitting member 140 to be turned on, then acquires a series of positional information (coordinate information) of the pen tip member 120 moving on the display panel 200 from the reflected light received by the IR light receiving member 160, and transmits the positional information to the wireless communication member 180.

The wireless communication member 180 transmits the positional information supplied from the digital pen control member 170 to the external smart terminal device 300 by short-range wireless communication (for example, Bluetooth).

With reference to FIG. 5, in the optical digital pen 100 according to the first embodiment of the invention, the IR light emitting member 140 and the digital pen control member 170 are electrically connected by an IR wiring member 141.

The IR light scattering member 150 is disposed close to the pen tip member 120 to be directed toward the display panel 200, and the IR light emitting member 140 is disposed close to the IR light scattering member 150. In FIG. 5, the IR light emitting member 140 and the IR light scattering member 150 are installed at the pen body member 110 corresponding to a side part of the pen tip member 120. On the other hand, the digital pen control member 170 is installed at a position such as an intermediate position of the pen body member 110 which is separated from the pen tip member 120.

In the first embodiment, the IR wiring member 141 is a configurational element that is disposed in a length direction of the pen body member 110 and electrically connects the digital pen control member 170 and the IR light emitting member 140.

Figure 6:
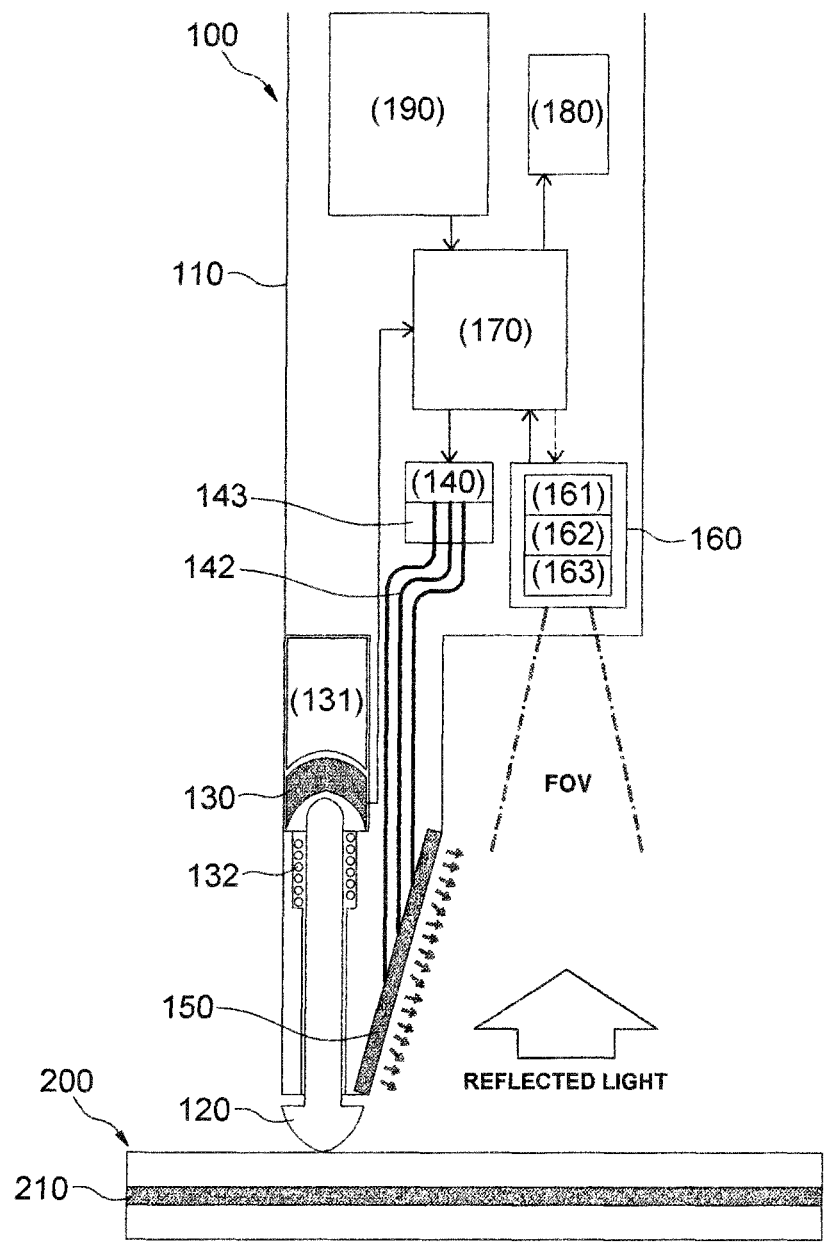
FIG. 6 is a diagram illustrating a second embodiment of the optical digital pen according to the invention.

FIG. 6 is a diagram illustrating a second embodiment of the optical digital pen 100 according to the invention.

In the optical digital pen 100 according to the second embodiment of the invention, the IR light emitting member 140 and the IR light scattering member 150 are installed to be separated from each other, and an optical fiber member 142 is installed between the members 140 and 150.

With reference to FIG. 6, the digital pen control member 170 and the IR light emitting member 140 are installed at an intermediate portion of the pen body member 110 which is separated from the pen tip member 120, and the IR light scattering member 150 is installed at the pen body member 110 corresponding to the side part of the pen tip member 120.

When the optical digital pen 100 has a slim design, the pen tip member 120, the IR light emitting member 140, and the IR light scattering member 150 are difficult to install together at an end portion of the pen body member 110. In addition, even when the slim design is not used, disposition of the pen tip member 120, the IR light emitting member 140, and the IR light scattering member 150 at the end portion of the pen body member 110 is not preferable in terms of a manipulation aspect according to a weight distribution.

Accordingly, in the second embodiment, the IR light emitting member 140 is disposed at an intermediate portion of the pen body member 110 which is separated from the pen tip member 120. The optical fiber member 142 is a configurational element that guides light between the IR light emitting member 140 and the IR light scattering member 150 which are installed to be separated from each other. In other words, the optical fiber member 142 is disposed in the length direction along the pen body member 110 and guides the light generated by the IR light emitting member 140 to the IR light scattering member 150.

FIG. 6 illustrates a state where the optical fiber member 142 guides the light to a back surface of the IR light scattering member 150 such that the light is scattered while being transmitted through the IR light scattering member 150. Depending on an embodiment, the optical fiber member 142 can be configured to guide the light to a front surface of the IR light scattering member 150 such that the light is scattered while being reflected from the IR light scattering member 150.

An optical connector member 143 is a configurational element that optically connects the IR light emitting member 140 and the optical fiber member 142 to each other. In order to enhance the light transmission efficiency between the IR light emitting member 140 and the optical fiber member 142, preferably, a mirror connector is employed as the optical connector member 143.

Figure 7:
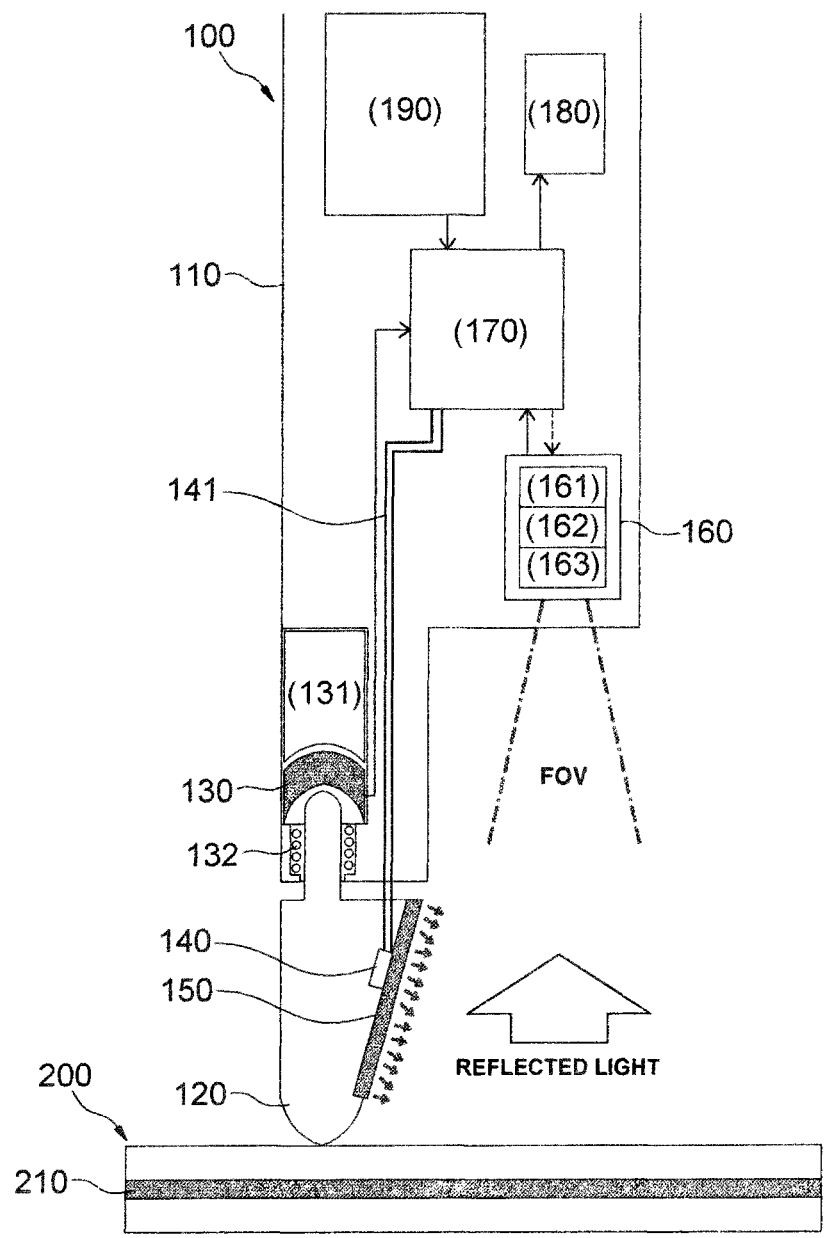
FIG. 7 is a diagram illustrating a third embodiment of the optical digital pen according to the invention.

FIG. 7 is a diagram illustrating a third embodiment of the optical digital pen 100 according to the invention.

In the optical digital pen 100 according to the third embodiment of the invention, the pen tip member 120, the IR light emitting member 140, and the IR light scattering member 150 are configured to have a single package form and perform linear movement as a single body with respect to the pen body member 110.

The IR light emitting member 140 and the IR light scattering member 150 are installed at the side part of the pen tip member 120 such that the members 120, 140, and 150 are formed as a single body, whereas the digital pen control member 170 is installed, for example, at an intermediate position of the pen body member 110 which is separated from the pen tip member 120. As described above, the IR light emitting member 140 and the digital pen control member 170 are disposed to be separated from each other in the pen body member 110. In the third embodiment, the IR wiring member 141 is a configurational element that electrically connects the digital pen control member 170 and the IR light emitting member 140 such that the members 140 and 170 are energized to each other.

Figure 8:
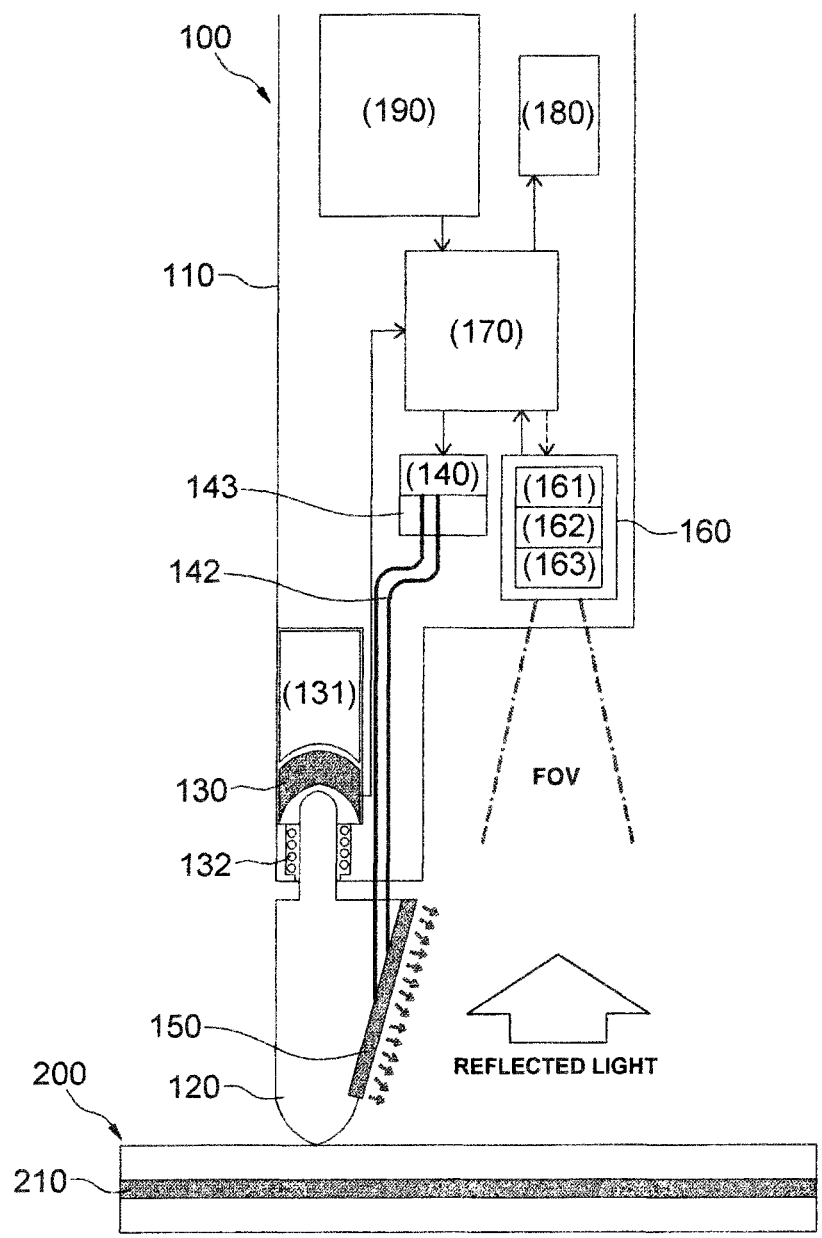
FIG. 8 is a diagram illustrating a fourth embodiment of the optical digital pen according to the invention.

FIG. 8 is a diagram illustrating a fourth embodiment of the optical digital pen 100 according to the invention.

In the optical digital pen 100 according to the fourth embodiment of the invention, the pen tip member 120 and the IR light scattering member 150 are configured to have a single package form, whereas the IR light emitting member 140 and the IR light scattering member 150 are installed to be separated from each other, and the optical fiber member 142 is installed between the members 140 and 150.

As described above with reference to FIG. 6, the IR light emitting member 140 is installed at an intermediate portion of the pen body member 110 which is separated from the pen tip member 120, and the optical fiber member 142 is configured to guide the light between the IR light emitting member 140 and the IR light scattering member 150 which are installed to be separated from each other as described above. Further, the optical connector member 143 is provided to optically connect the IR light emitting member 140 and the optical fiber member 142 to each other. In order to enhance the light transmission efficiency between the IR light emitting member 140 and the optical fiber member 142, preferably, a mirror connector is employed as the optical connector member 143.

In addition, the pen tip member 120 and the IR light scattering member 150 are configured to have a single package form and perform linear movement as a single body with respect to the pen body member 110.

Figure 9:
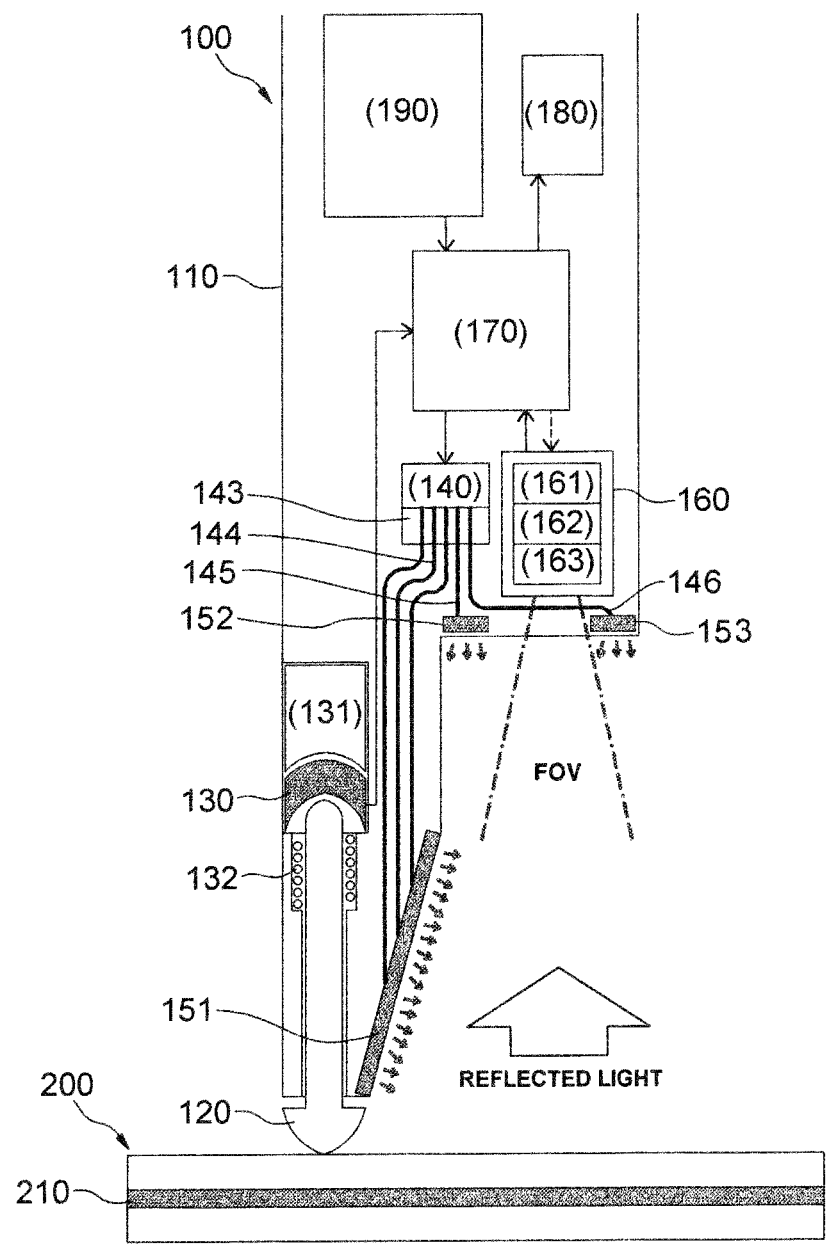
FIG. 9 is a diagram illustrating a fifth embodiment of the optical digital pen according to the invention.
Figure 10:
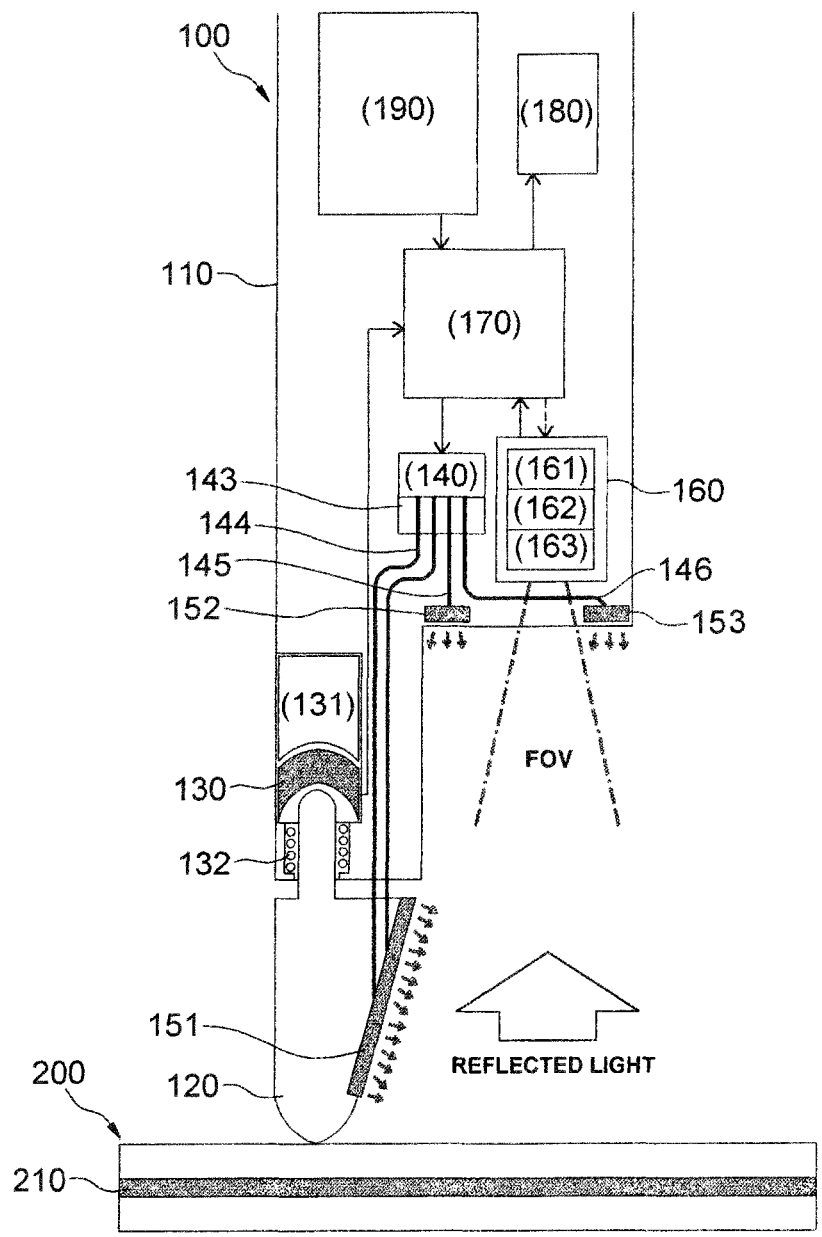
FIG. 10 is a diagram illustrating a sixth embodiment of the optical digital pen according to the invention.

FIGS. 9 and 10 are diagrams illustrating respective fifth and sixth embodiments of the optical digital pen 100 according to the invention. The fifth and sixth embodiments in FIGS. 9 and 10 have respective configurations modified from the second and fourth embodiments in FIGS. 6 and 8. Hereinafter, parts modified from the second and fourth embodiments will be described.

With reference to FIGS. 9 and 10, the optical digital pens 100 according to the fifth and sixth embodiments differ from those according to the second and fourth embodiments in that a lateral light scattering member 151 and downward light scattering members 152 and 153 are provided as the IR light scattering members and a lateral optical fiber member 144 and downward optical fiber members 145 and 146 are provided as the optical fiber members.

First, the lateral light scattering member 151 is a configurational element that is disposed close to the pen tip member 120 to be directed toward the display panel 200 and scatters the light generated by the IR light emitting member 140 in several directions with respect to the display panel 200. The lateral light scattering member 151 is installed at the pen body member 110 corresponding to the side part of the pen tip member 120 in the fifth embodiment, and it is formed to have a single package form together with the pen tip member 120 in the sixth embodiment.

Further, the downward light scattering members 152 and 153 are configurational elements that are disposed at a part of the pen body member 110 bent to face the display panel 200 and scatter light generated by the IR light emitting member 140 in several directions with respect to the display panel 200.

As illustrated in FIGS. 9 and 10, preferably, the lateral light scattering member 151 is disposed at a tilt to be directed toward the display panel 200, and the downward light scattering members 152 and 153 are configured to be disposed to face the front surface of the display panel 200.

The lateral light scattering member 151 is configured to secure the intensity of reflected light which is transmitted to the FOV of the IR light receiving member 160 when a user uses the optical digital pen 100 at a tilt on the display panel 200 having a smooth surface. However, a configuration in which light is radiated only through the lateral light scattering member 151 has a disadvantage in that the intensity of reflected light which is transmitted to the FOV of the IR light receiving member 160 is difficult to secure when a user uses the optical digital pen 100 upright on the display panel 200 having a smooth surface.

In this respect, in the fifth and sixth embodiments, the downward light scattering members 152 and 153 are configured to be disposed so as to secure the intensity of the reflected light which is transmitted to the FOV of the IR light receiving member 160 when a user uses the optical digital pen 100 upright on the display panel 200 having a smooth surface.

The lateral optical fiber member 144 is a configurational element that guides the light generated by the IR light emitting member 140 to the lateral light scattering member 151. The lateral light scattering member 151 is disposed close to the pen tip member 120, and thus the lateral optical fiber member 144 is disposed in the length direction along the pen body member 110 from the IR light emitting member 140.

The downward optical fiber members 145 and 146 are configured to guide the light generated by the IR light emitting member 140 to the downward light scattering members 152 and 153.

Figure 11:
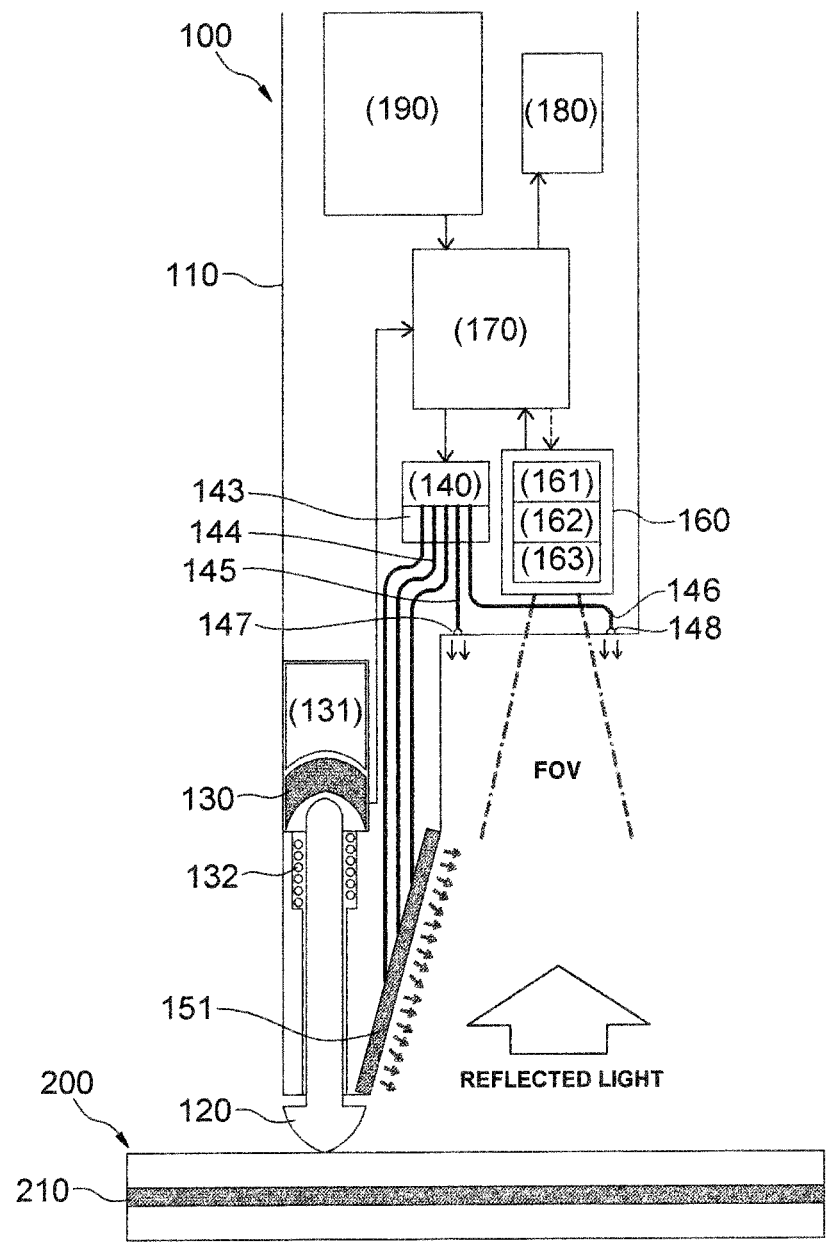
FIG. 11 is a diagram illustrating a seventh embodiment of the optical digital pen according to the invention.
Figure 12:
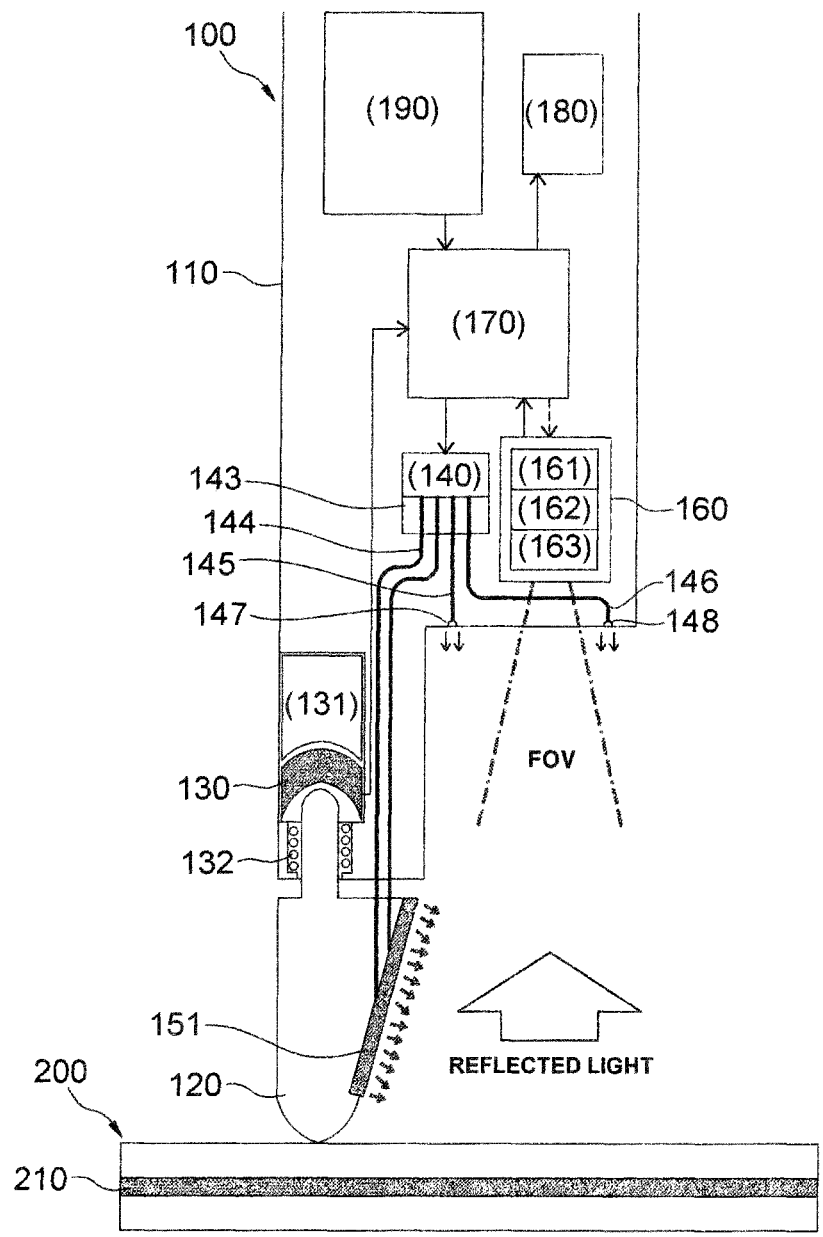
FIG. 12 is a diagram illustrating an eighth embodiment of the optical digital pen according to the invention.

FIGS. 11 and 12 are diagrams illustrating respective seventh and eighth embodiments of the optical digital pen 100 according to the invention. The seventh and eighth embodiments in FIGS. 11 and 12 have respective configurations modified from the fifth and sixth embodiments in FIGS. 9 and 10. Hereinafter, parts modified from the fifth and sixth embodiments will be described.

With reference to FIGS. 11 and 12, the optical digital pens 100 according to the seventh and eighth embodiments include downward light outlet members 147 and 148 instead of the downward light scattering members 152 and 153. The downward light outlet members 147 and 148 are configurational elements that are disposed at a part of the pen body member 110 which is bent to face the display panel 200 and radiate the light generated by the IR light emitting member 140 downward to the display panel 200. When a user uses the optical digital pen 100 upright on the display panel 200 having a smooth surface, radiation of the light without scattering is considered to increase a recognition ratio. The downward light outlet members 147 and 148 can be realized as a light outlet hole or can be realized as a transparent plastic.

The invention is advantageous in that even when an optical digital pen is used at a tilt on a panel having a smooth surface made of glass or transparent plastic, reflected light for acquiring positional information of a pen tip is sufficiently received.

According to the invention, the optical digital pen has an advantage of being compatibly used with a display panel of an electronic device such as a tablet PC or a laptop computer.

While the present invention has been described with respect to the specific embodiments, it will be apparent to those skilled in the art that various changes and modifications may be made without departing from the spirit and scope of the invention as defined in the following claims.

What is claimed is:

1. An optical digital pen by use of light scattering, comprising:
   a pen body member which forms a body of the optical digital pen;
   a pen tip member which is connected to one end portion of the pen body member, wherein the pen tip member forms a pen tip of the optical digital pen;
   a pressure sensor member which senses, by detecting pressure, an event in which the pen tip member comes into physical contact with a display panel;
   an IR light emitting member which generates light which is radiated to the display panel, wherein the display panel is formed of a position code;
   a lateral light scattering member which is disposed at a tilt to be close to the pen tip member and be directed toward the display panel, between the IR light emitting member and the display panel, wherein the lateral light scattering member scatters light irregularly in several directions with respect to the display panel in a process of transmitting or reflecting the light generated by the IR light emitting member;
   a downward light scattering member which is disposed to face a front surface of the display panel, with the pen body member being bent between the IR light emitting member and the display panel, wherein the downward light scattering member scatters light generated by the IR light emitting member irregularly in several directions with respect to the display panel;
   a lateral optical fiber member which is disposed in a length direction along the pen body member, wherein the lateral optical fiber member guides the light generated by the IR light emitting member to the lateral light scattering member;
   a downward optical fiber member which guides the light generated by the IR light emitting member to the downward light scattering member;
   an IR light receiving member which receives reflected light reflected from the display panel and senses the position code of the display panel;
   a digital pen control member which controls turning-on or turning-off of the IR light emitting member based on pressure information transmitted from the pressure sensor member, wherein the digital pen control member acquires a series of positional information of the pen tip member moving on the display panel, from the reflected light received by the IR light receiving member;
   a wireless communication member which transmits the series of positional information acquired by the digital pen control member to an external smart terminal device by short-range wireless communication;
   wherein the lateral light scattering member is installed at a side part of the pen tip member such that the pen tip member and the lateral light scattering member are configured to have a single package form and perform linear movement as a single body with respect to the pen body member, and
   wherein the IR light emitting member and the digital pen control member are installed at respective positions of the pen body member which are separated from the pen tip member.

2. The optical digital pen by use of light scattering of claim 1,
   wherein the pen tip member has a rear end portion which projects and is rounded, and a portion of the pressure sensor member which is brought into contact with the rear end portion of the pen tip member is hollowed and rounded such that the pressure sensor member is configured to be fitted over and grip the rear end portion of the pen tip member.

3. An optical digital pen by use of light scattering, comprising:
   a pen body member which forms a body of the optical digital pen;
   a pen tip member which is connected to one end portion of the pen body member, wherein the pen tip member forms a pen tip of the optical digital pen;
   a pressure sensor member which senses, by detecting pressure, an event in which the pen tip member comes into physical contact with a display panel;
   an IR light emitting member which generates light which is radiated to the display panel, wherein the display panel is formed of a position code;
   a lateral light scattering member which is disposed at a tilt to be close to the pen tip member and be directed toward the display panel, between the IR light emitting member and the display panel, wherein the lateral light scattering member scatters light irregularly in several directions with respect to the display panel in a process of transmitting or reflecting the light generated by the IR light emitting member;
   a downward light outlet member which is disposed to face a front surface of the display panel, with the pen body member being bent between the IR light emitting member and the display panel, wherein the downward light outlet member radiates light generated by the IR light emitting member downward in a non-scattering state to the display panel;
   a lateral optical fiber member which is disposed in a length direction along the pen body member, wherein the lateral optical fiber member guides the light generated by the IR light emitting member to the lateral light scattering member;

a downward optical fiber member which guides the light generated by the IR light emitting member to the downward light outlet member;

an IR light receiving member which receives reflected light reflected from the display panel and senses the position code of the display panel;

a digital pen control member which controls turning-on or turning-off of the IR light emitting member based on pressure information transmitted from the pressure sensor member, wherein the digital pen control member acquires a series of positional information of the pen tip member moving on the display panel, from the reflected light received by the IR light receiving member;

a wireless communication member which transmits the series of positional information acquired by the digital pen control member to an external smart terminal device by short-range wireless communication;

wherein the lateral light scattering member is installed at a side part of the pen tip member such that the pen tip member and the lateral light scattering member are configured to have a single package form and perform linear movement as a single body with respect to the pen body member, and wherein the IR light emitting member and the digital pen control member are installed at respective positions of the pen body member which are separated from the pen tip member.

4. The optical digital pen by use of light scattering of claim 3,
wherein the pen tip member has a rear end portion which projects and is rounded, and a portion of the pressure sensor member which is brought into contact with the rear end portion of the pen tip member is hollowed and rounded such that the pressure sensor member is configured to be fitted over and grip the rear end portion of the pen tip member.

5. The optical digital pen by use of light scattering of claim 3
wherein the lateral light scattering member is installed at the pen body member corresponding to a side part of the pen tip member.

6. The optical digital pen by use of light scattering of claim 1,
wherein the lateral light scattering member is installed at the pen body member corresponding to a side part of the pen tip member.

* * * * *